July 30, 1940.                A. C. RUSTAD                2,209,719
                TELEFACSIMILE METHOD AND APPARATUS
                    Filed March 12, 1938        6 Sheets-Sheet 1
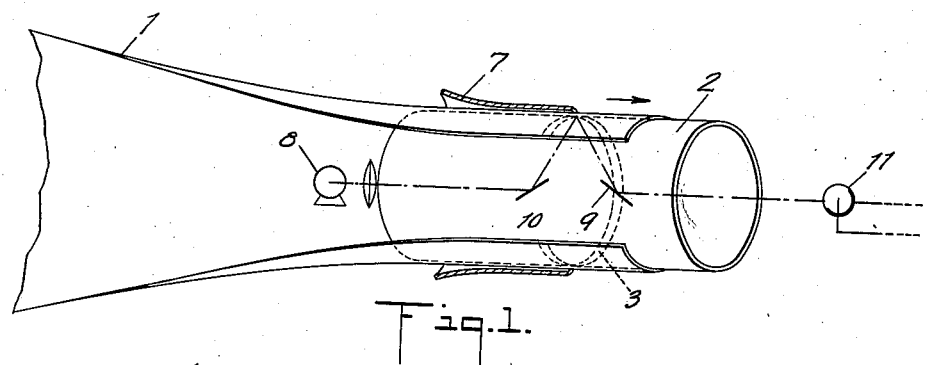
Fig.1.
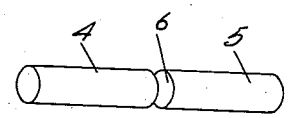
Fig.1.A.
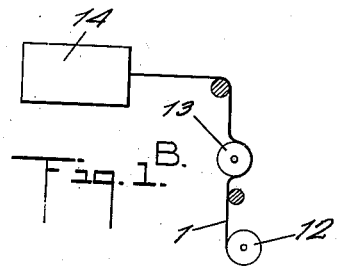
Fig.1.B.
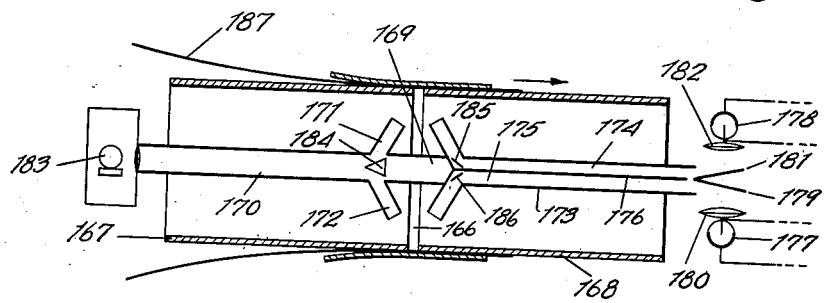
Fig.1E.
Arthur C. Rustad
INVENTOR
BY John J. Logan
ATTORNEY

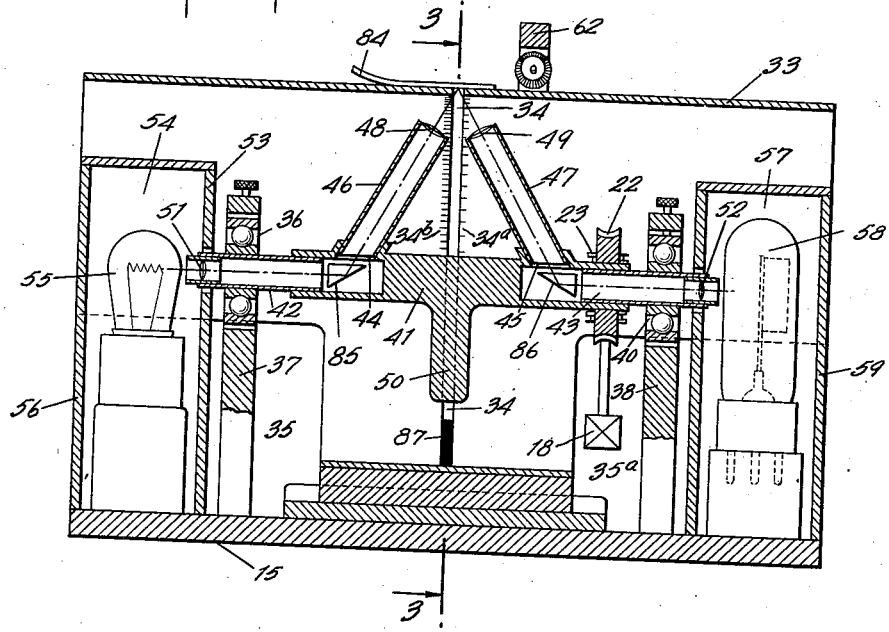
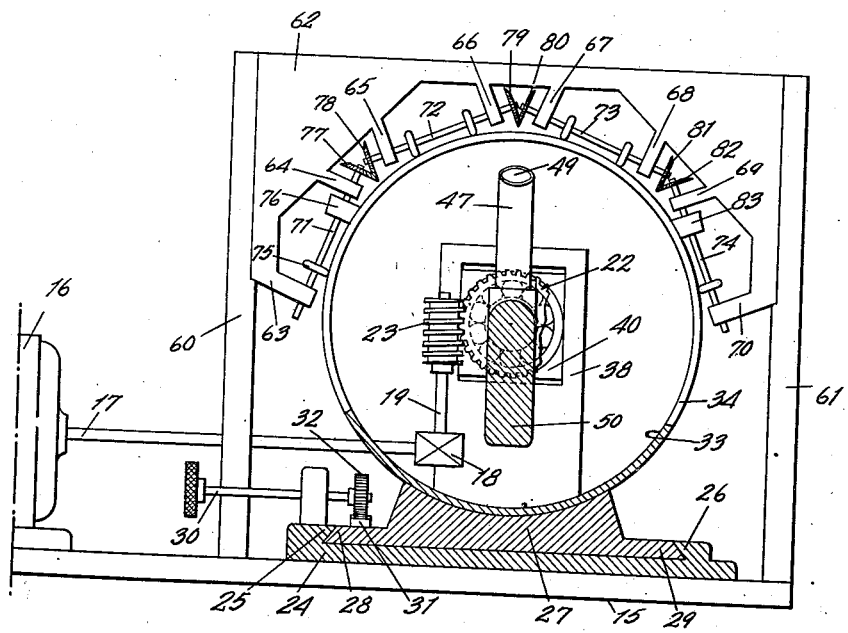

July 30, 1940.  A. C. RUSTAD  2,209,719
TELEFACSIMILE METHOD AND APPARATUS
Filed March 12, 1938  6 Sheets-Sheet 3

Arthur C. Rustad
INVENTOR

BY John J. Rogan
ATTORNEY

July 30, 1940.   A. C. RUSTAD   2,209,719
TELEFACSIMILE METHOD AND APPARATUS
Filed March 12, 1938   6 Sheets-Sheet 4
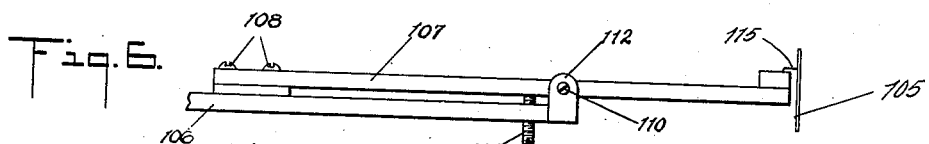
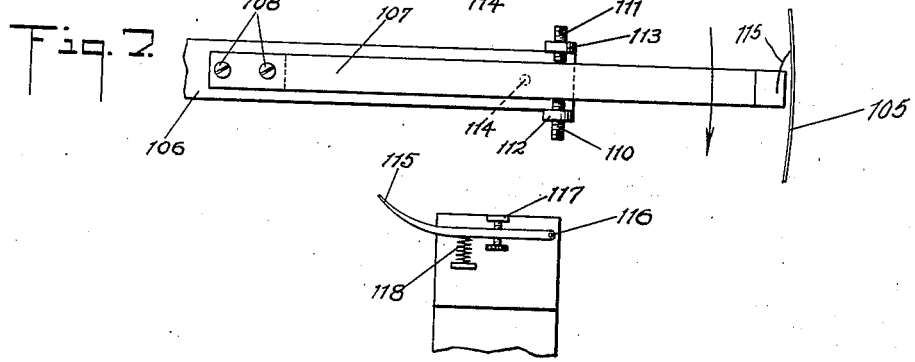
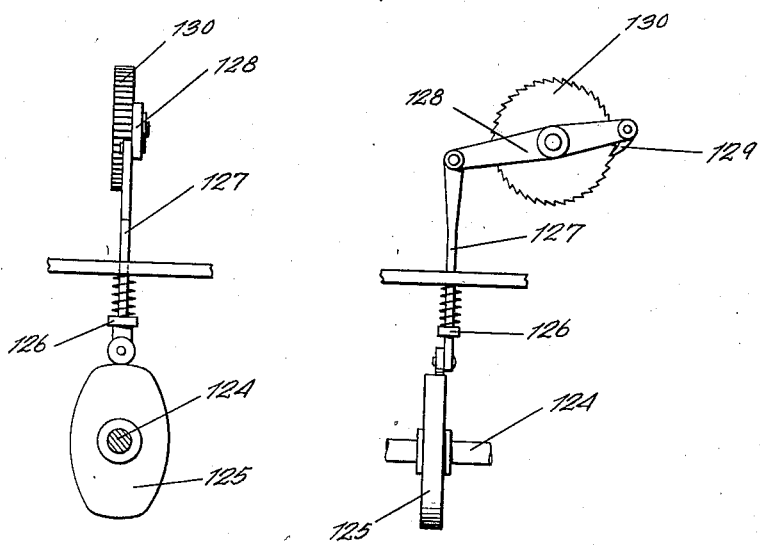
Arthur C. Rustad
INVENTOR
BY John J. Rogan
ATTORNEY July 30, 1940.  A. C. RUSTAD  2,209,719

TELEFACSIMILE METHOD AND APPARATUS

Filed March 12, 1938  6 Sheets—Sheet 5

Arthur C. Rustad
INVENTOR

BY John J. Rogan
ATTORNEY

Patented July 30, 1940

2,209,719

UNITED STATES PATENT OFFICE 2,209,719

TELEFACSIMILE METHOD AND APPARATUS

Arthur C. Rustad, Brooklyn, N. Y., assignor to Press Wireless, Inc., Chicago, Ill., a corporation of Delaware Application March 12, 1938, Serial No. 195,486

17 Claims. (Cl. 178—6.6)

This invention relates to telefacsimile systems and more especially to electro-optical scanning arrangements for use in such systems.

A principal object of the invention is to provide a relatively simple, compact, and reliable scanner for transmitting facsimile signals, and particularly where the apparatus is subjected to continuous use, for example in news distribution and the like.

Another object is to provide an improved recorder for telefacsimile signals.

Heretofore there have been devised numerous telefacsimile transmitters, the scanning systems of which may be divided into two types as follows:

1. Those wherein the subject matter is in the form of a sheet wrapped around a drum and fastened thereto so that the sheet moves as a unit with the drum.

2. Those wherein the subject matter is in the form of a continuous web or strip which is moved past a scanning device which executes successive transverse scanning paths across the width of the strip with the elements of the strip in linear formation.

The first of the above systems is obviously limited to the transmission of such things as picture films of relatively small length, and is therefore wholly unadaptable for continuous transmission and reproduction from a moving strip or tape since it requires the stopping of the equipment to reload the scanning drum. The machines that have heretofore been used in the second of the above systems have required that the web be flat and that some kind of reciprocable or oscillating scanner be employed. Because of the reciprocating motion of such scanner, the usefulness of the mechanism is very limited. One of the decided drawbacks of any such reciprocating or oscillating type of scanning, is that the scanning arm or carrier is liable to overshoot at each end of its scanning traverse. Furthermore, the relatively high speed at which the scanning arm must be reciprocated, causes unavoidable vibration which eventually results in loosening of the important parts and rapid wear thereof. Furthermore, in the oscillating type of scanner, the scanning arm must move in an arcuate path and distortion occurs at the end portions of each scanned line.

Accordingly, it is a principal object of this invention to provide a scanning arrangement for a telefacsimile transmitter whereby the above-noted and other disadvantages are overcome.

This object is achieved primarily by employing a centrifugally balanced continuously rotatable scanning member which scans a longitudinally movable record strip while the latter is maintained in curved or concave form for an appreciable portion of its length so that each and every scanned element is at the same radial distance from the light sensitive cell or the like.

Another object is to provide a novel method of supporting and feeding a longitudinally movable record strip in a step-by-step motion past a rotating scanning device.

Another object is to provide a scanning arrangement for a longitudinally moving record strip, whereby the strip is formed to an arcuate shape across its width and around the periphery of a fixed drum or support, the strip being fed longitudinally of the support during scanning.

A feature of the invention relates to a scanning arrangement for a longitudinally movable record strip employing a fixed light source and a fixed light sensitive cell, in conjunction with a continuously rotatable optical system, the latter being so arranged that the distance between the optical system and the record strip is uniform during the entire length of each scanned line.

A further feature relates to the means for intermittently feeding a record strip from a supply reel, and arcuately curving the strip transversely at the scanning area thereof.

A further feature relates to the novel mechanism for feeding a record strip along a curved scanning support while maintaining the strip taut against said support at the scanning area.

A further feature relates to a curved support for supporting a moving record strip in curved transverse form, said support having a circumferential scanning slot and a continuously rotatable optical system which scans the concave face of said strip through said slot.

A further feature relates to a curved scanning support for a record strip, the support having a circumferential scanning slot through which the record is scanned, and a continuously rotatable optical system including means to vary the position of the optical system with relation to said slot to scan either the record or to generate one or more control frequencies with or without scanning of the record.

A still further feature relates to the novel organization, arrangement and relative location of parts which constitute an improved telefacsimile transmitter and receiver which is compact in form and is rugged in construction thus rendering it particularly useful for continuous operation, for example in news distribution and the like.

Other features and advantages not specifically enumerated will be apparent after consideration of the following detailed descriptions and the appended claims. While certain speific embodiments of the invention will be disclosed herein, it will be understood that this is done merely for explanatory purposes and not by way of limitation. Accordingly, in the drawings:

Fig. 1 is a schematic perspective diagram to explain certain fundamentals of the invention.

Fig. 1a is a modification of Fig. 1.

Fig. 1b is a schematic diagram explaining certain applications of the invention to continuous telefacsimile transmission.

Fig. 2 is a longitudinal sectional view of a telefacsimile transmitter embodying features of the invention.

Fig. 3 is a sectional view of Fig. 2 taken along the line 3—3 thereof.

Figs. 6, 7 and 8 are detailed views of the recording stylus arrangement of Figs. 4 and 5.

Figs. 9 and 10 are detailed views of the paper feed control mechanism of Figs. 4 and 5.

Fig. 16 is a schematic diagram of a modification of Fig. 11.

Figure 4:
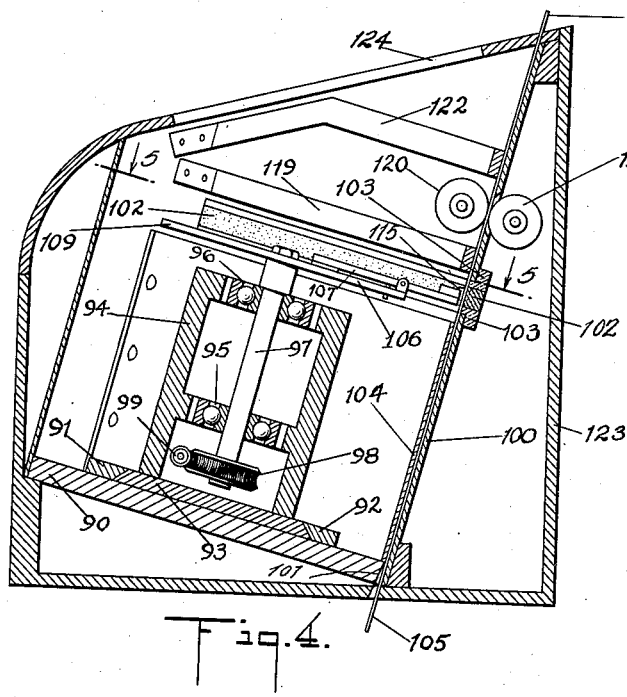
Fig. 4 is a vertical cross-sectional view of a telefacsimile recorder embodying features of the invention.
Figure 5:
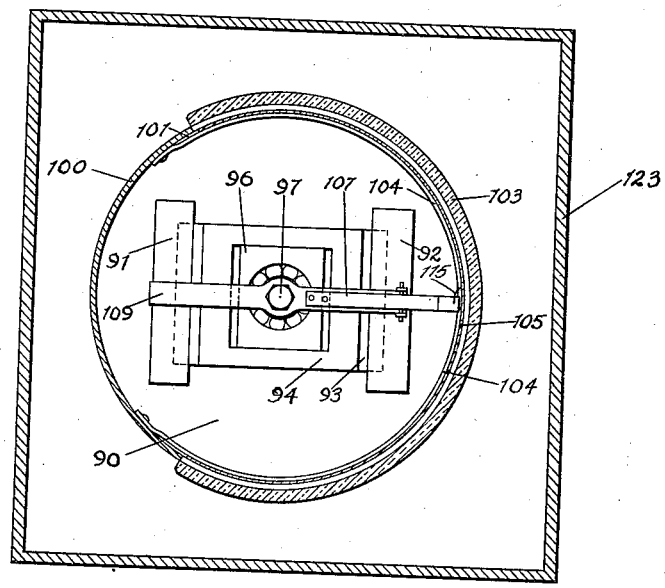
Fig. 5 is a sectional view of Fig. 4 taken along the line 5—5 thereof.

Referring to Fig. 1 the numeral 1 represents a strip or sheet containing the pictures, writing, printing, etc., to be transmitted by telefacsimile signals. The numeral 2 represents a stationary curved support which may take the form of a metal cylinder having a scanning slot 3 extending around the greater part of the periphery thereof. If desired, the scanning slot may be circumferentially complete, for example by mounting two hollow cylinders 4, 5, (Fig. 1a) coaxially with their opposed ends in spaced relation to define a scanning slot 6. In this latter case one or both of the cylinders can be longitudinally movable to vary the width of the scanning slot.

As shown in Fig. 1, the record strip 1 is fed in the direction of the arrow, the strip being fed between the outer curved guide plate 7 and the outer surface of support 2. Associated with the support 2 is a source of light 8 and a suitable optical system including a mirror 9 for projecting a spot of light of elemental size on to the scanning slot 3 interiorly of the support 2. This spot therefore illuminates the inner or concave surface of the record strip 1. The light which is reflected from the illuminated spot is reflected by a mirror 9 and is picked up by a suitable optical system and impressed upon the light sensitive cell 11, the response of which is amplified and transmitted either by wire or radio in any well known manner.

In order to scan each transverse linear element of the strip 1, the optical system which projects the elemental light spot through the slot 3, has a member which is continuously rotatable within the support 2 so that the scanning spot traverses a circular path of uniform diameter around the slot 3. Preferably, the record 1 is fed in timed relation to the rotation of the said rotatable member of the scanning system so that the record strip is advanced in the direction of the arrow a predetermined distance, for example 0.01 inch, per complete rotation of the rotatable scanning member. This general arrangement has a number of advantages over prior scanning arrangements amongst which are the following:

First, since the support 2 is stationary, the record 1 can be in a strip or extended sheet form and can be fed in unlimited lengths around and along said support thus enabling continuous messages to be transmitted by telefacsimile signals. For example, strip 1 may be fed from a telegraph page printer or telegraph tape printer of known construction so that the message is printed in successive lines which can be scanned and transmitted without interruption by the scanning system shown. For example, as shown in Fig. 1b, the tape or endless sheet 1 may be supplied from a supply reel 12 and through and around the printing platen 13 of a typewriter or the like, whence it passes through the scanning mechanism 14 similar to that of Fig. 1. The typewriter which prints the message on strip 1 may be either the conventional manually operable typewriter, or any well-known form of automatically operated telegraph printer such as a telegraph tape printer or a telegraph page printer, which is operated by received telegraph impulses, it being understood that any well-known form of take-up mechanism may be provided between unit 13 and unit 14.

The second advantage of the arrangement of Fig. 1 is that the scanning mechanism being of the continuously rotatable type can be centrifugally balanced, thus avoiding the wear and possible sources of inaccuracy which are always existent with scanners of the reciprocataing or oscillating type.

Thirdly, since the record strip 1 is, at the scanning region arcuately curved around the outer periphery of support 2, it is possible to scan each linear element uniformly since the scanning arm is always at the same radial distance from the record at the scanning region, and it is possible to maintain the strip taut around the support.

Fourthly, it is possible to obtain line for line transmission and reproduction of the message while moving the strip parallel to the length of the drum 2.

Lastly, since the scanning and optical systems are entirely within the drum 2, it is possible to build a compact unit without sacrificing precision and ruggedness.

Referring to Figs. 2 and 3, there is shown one preferred structural embodiment of the more important parts of a telefacsimile transmitter embodying the principles of Fig. 1. The transmitter unit as a whole is carried by a suitable base 15 on which is supported the main driving motor 16 which may be of any well-known type, preferably a synchronous motor. The shaft 17 of motor 16 is connected through a suitable gear train 18 to drive a shaft 19 which at its other end drives a wormwheel 22 by means of a worm 23. Wheel 22 is coupled to the rotatable shaft of the optical scanner to be described. Rigidly fastened to base 15 in any suitable manner is another base member 24 which is provided with longitudinal guides 25, 26 at opposite sides to receive the pedestal 27 provided with parallel guides 28, 29, whereby the pedestal may be adjusted longitudinally with respect to base 24. For this latter purpose, an adjusting arm 30 is coupled to pedestal 27 by a rack 31 and pinion 32, so that by turning the arm 30, the pedestal 27 may be adjusted longitudinally for purposes to be described. Preferably, the member 27 is provided with suitable locking means whereby it may be positively fastened in its adjusted position.

The upper end of member 27 is circularly concave, and rigidly fastened thereto in any suitable manner is a hollow metal drum 33 which is provided with a peripheral slot 34 extending around approximately two-thirds of the circumference. Slot 34 may be of any desired width depending upon whether it is by itself to define the width of the scanning light spot, in which case it may be of the order of 0.01 inch. Where the size of the scanning light spot is determined by an apertured mask in the optical system to be described, then slot 34 may be of the order of one-eighth of an inch. The ends of drum 33 are cut away as indicated at 35 and 35ª, to accommodate a pair of bearing brackets 37, 38, each having at its upper end vertically adjustable ball bearings 39, 40. Mounted for rotation in bearings 39, 40, is a rotatable scanning arrangement comprising a shaft 41 having at each end a hollow section into which are tightly fitted and fastened corresponding hollow metal tubes 42, 43. The peripheral wall of each of the hollow shaft ends is cut out to provide windows 44, 45, into which are tightly fitted the opaque tubes 46, 47. Tubes 46 and 47 are mounted at an angle to each other so that their longitudinal axes intersect approximately at the outer surface of drum 33. Fitted within the tubes 46, 47, are suitable lenses 48, 49, as shown, and the said tubes are symmetrically disposed with respect to the axis of rotation of the rotatable system. In order to balance the rotatable system centrifugally, the shaft 41 is provided with a counterbalance 50 which may be integral with the shaft. Fastened to the right-hand end of shaft 41 is the wormwheel 22 described above.

Adjustably mounted in the end of member 42 is a lens system 51, and adjustably mounted in the member 43 is another lens system 52. Member 42 may extend through the wall of a light-tight housing 54, wherein is mounted any wellknown form of lamp 55 such as used in picture transmission systems. Housing 54 may be provided with a removable cover plate 56 to allow for the insertion and adjustment of lamp 55. Likewise member 43 may extend through the wall of a similar light-tight housing 57 in which is mounted a light sensitive or photoelectric cell 58, a removable cover plate 59 being provided for the cell compartment.

Fastened to base 15 are two uprights 60, 61 on which is mounted for vertical adjustment a bracket 62 having a plurality of arms 63 to 70 in which are mounted the rotatable shafts 71 to 74. Shaft 71 has fastened thereto a pair of paper feed rollers 75, 76, roller 76 preferably being wider than roller 75 for purposes to be described. Shaft 71 has fastened thereto a bevelled driving gear 77 which meshes with a similar gear 78 fastened to shaft 72. The other end of shaft 72 has fastened thereto a bevelled gear 79 meshing with a bevelled gear 80 on shaft 73. Likewise gear 81 on the shaft 73 meshes with a bevelled gear 82 on shaft 74. Shafts 72 and 73 carry feed rollers similar to roller 75, and shaft 74 carries an additional roller 83 similar to roller 76. By means of a suitable gear train (not shown), shaft 74 is driven in positive timed relation to the rotation of the scanning system so that the record blank is advanced longitudinally along the peripheral surface of drum 33, a predetermined fixed distance for each complete rotation of the scanning members.

The record blank which may be in the form of a continuous strip carrying the message to be transmitted is paid off from a suitable supply reel and is fed between the curved guiding plate 84 and the surface of drum 33. By means of the guide plate 84 the strip is formed to an arcuate shape transversely thereof and is held taut against the surface of drum 33 by rollers 76 and 83. By reason of the shape of rollers 76 and 83 there is a continuous tendency for these rollers to hold the record strip taut around the periphery of the drum when the rollers are rotated in the direction of the arrow (Fig. 2) to pull the paper past the slot 34. It will be understood of course that the record strip is fed underneath guide 84 and underneath the feed rollers with the side of the strip carrying the message facing the lenses 48 and 49. Consequently, when the motor is set in operation, light from the lamp 55 is projected through lens 51, thence to the mirror or reflecting prism 85, whence it is reflected through the slot 34 on to the record strip. If desired an apertured mask can be interposed between members 48 and 85 to confine the illumination of the record to an elemental spot, or to a strip of light of elemental width projecting transversely across slot 34. The light from the illuminated elemental area of the record strip is reflected through lens 49 and thence by a mirror or reflecting prism 86 through lens 52 to the photoelectric cell 58. It will be understood of course that the prisms or mirrors 85, 86, are fastened within the hollow sections of shaft 41 so as to rotate as a unit therewith. Consequently, as the scanning system rotates, the record strip is illuminated in parallel lines extending transversely thereof and each elemental area of the record strip is translated into a corresponding electric current under control of cell 58. This current may be amplified and transmitted to a receiving point either by wire or radio in any wellknown manner.

The receiving mechanism may be of any wellknown construction maintained in synchronism with the scanning mechanism above described in any wellknown manner. If desired, the synchronism may be effected by utilizing the non-slotted portion of the drum 33. In other words, when the lenses 48 and 49 face the non-slotted portion of drum 33, the record strip is blanked off and a synchronizing impulse of a predetermined maximum or predetermined minimum amplitude is generated in the cell 58. If desired, the unslotted circumference of drum 33 which is in circumferential alignment with slot 34 may be coated with a black or white mark as indicated by numeral 87 so that the registry of the lenses 48, 49 therewith causes a corresponding increased response from the cell 58 which response may be used for synchronizing purposes in the manner well known in the picture transmission art.

As pointed out above, the drum 33 is adjustable longitudinally. The purpose of this adjustment is to vary the longitudinal position of the slot 34 with respect to the lenses 48 and 49. In the normal or neutral position of the drum 33, the slot 34 is disposed symmetrically with relation to the said lenses so that the light from lamp 55 passes through the slot 34 to illuminate the record strip. When it is desired to transmit a current of a predetermined frequency, for example 500 cycles per second, the drum 33 is adjusted by means of arm 30 towards the right (Fig. 2) so that the light from lamp 55 impinges on the left-hand margin of slot 34. This margin of the slot may be provided with a series of alternate white and black lines 34a so that as the scanning system rotates, there is produced in the output of cell 58 a current of a regular frequency determined by the rotational speed of the scanning system and the number of white and black lines on the inside surface of drum 33 which are scanned. Should it be desired to send out a regular frequency current of a different frequency, for example 1000 cycles per second, the drum 33 is shifted towards the left so that the light from lamp 55 impinges upon the right-hand margin of the slot 34, this margin being provided with twice as many white and black lines 34b as those appearing on the left margin of the slot. Consequently, as the scanning system rotates, the lines on the right-hand margin of slot 34 are scanned and produce in the output of cell 58 a current of a fixed frequency determined by the scanning rate. If desired, the scanning spot for scanning the record strip may be sufficiently wide so as to extend to one side or the other of slot 34 with the result that while the picture strip is being scanned, there is simultaneously generated a fixed frequency component determined by which set of white and black lines on the inside surface of the drum 33 are being scanned together with the record strip. As is well known in the art, this frequency component may be used for automatic synchronizing or any other control purpose.

While in the foregoing descriptions, the scanning slot 34 is provided around only two-thirds of the periphery of drum 33 and the record strip likewise is curved only around approximately two-thirds of the drum, it will be understood that the said slot may extend a greater or less distance around the periphery of the drum depending upon the transverse width of the record being scanned.

A preferred form of recorder that may be used to reproduce the original message under control of the cell 58 is shown in Figs. 4 to 11 inclusive. Attached to a circular base 90 are a pair of longitudinal guides 91, 92 for guiding another base member 93. Bracket 94 is fastened to member 93 and carries a pair of ball bearing supports 95, 96, for a shaft 97. Fastened adjacent the lower end of shaft 97 is a wormwheel 98 which is driven by a worm 99 from a suitable motor (not shown) which is synchronized in any well-known manner with motor 2 at the transmitter so that shaft 97 rotates in synchronism with shaft 41. Fastened to base 90 is a cylindrical metal drum 100, having a circumferential gap 101 in which is insulatingly mounted a curved conductive strip 102 preferably of carbon or the like, which strip has its inner or concave face flush with the inner face of drum 100. Strip 102 may be insulated from drum 100 in any suitable manner, for example by having attached to its lateral edges shouldered insulator strips 103 which are fastened to the periphery of drum 100 in any suitable manner. Mounted in spaced relation to the inner surface of drum 100, is a curved paper guide plate 104, by means of which the recording strip 105 is maintained transversely concave against the inner surface of drum 100 and carbon insert 102. If desired, the support 104 may be spring-pressed against the recording strip. The member 90 for approximately two-thirds of its periphery is undercut so as to provide with member 100, an arcuate slot through which the recording paper or strip may be fed from a pay-off reel (not shown).

Fastened to the upper end of shaft 97 is a centrifugally balanced stylus arm 106 (Figs. 6, 7 and 8) which carries a flexible metal arm 107, fastened by screws 108 to arm 106. The arm 106 may be counterbalanced by a suitable member 109. If desired, the portion of the arm 107 through which the screws 108 pass may be provided with slots, of greater width than the screw diameter in order to permit longitudinal adjustment between the arms 106 and 107. Arm 107 is preferably arranged so that it may be adjusted vertically and horizontally to the arm 106. For this purpose, the arm 107 is provided with a pair of adjustable stops 110, 111 (Figs. 6 and 7) by means of which the arm 107 can be adjusted horizontally (Fig. 7) with respect to arm 106. The stops 110, 111, may be threaded into the supports 112, 113, so that the arm 107 can be adjusted and rigidly clamped between the opposed ends of members 110 and 111. For the purpose of adjusting the arm 107 vertically with respect to arm 106, it is preferably of flexible metal and there is threaded through arm 106 an adjustable stop 114. The stylus point 115 (Fig. 8) which is preferably curved and pointed as shown is pivotally supported at 116 and is yieldingly held against the stop 117 by a compression spring 118.

The stylus 115 is adjusted so as to engage lightly the concave surface of the recording strip 105 to complete an electrical circuit from the stylus through the chemically treated strip 105 to the carbon insert 102. It will be understood of course, that the recording strip 105 has been previously treated by any well known chemical which is normally colorless or of a uniform color but which when acted upon by the facsimile signal currents between members 115 and 102, changes color to reproduce the original message or reproduction. Inasmuch as chemically treated papers of this kind are well known in the facsimile art, a detailed description thereof is not believed necessary herein. It will be understood however, that the currents for producing the electrochemical action in the strip 105 are controlled by the received facsimile impulses after suitable amplification and/or detection, the amplified impulses being impressed across the stylus 115 and member 102. For this purpose if desired, a brush (not shown) may bear on the shaft 97 which brush is connected to one side of the incoming picture signal circuit, the other side of the picture signal circuit being connected by a wire (not shown) to the conductor ring 102.

As the strip 105 leaves the recording area, it passes over a curved paper guide 119 fastened interiorly of drum 100, and thence between the feed rollers 120, 121, disposed on opposite sides of the drum 100. It will be understood of course that the drum 100 is provided with a cut-out or window adjacent the rollers 120, 121, so as to allow the roller 121 to project partially therethrough into contact with the paper 105. Preferably, one or both of the rollers 120, 121 are in spring-pressed engagement with the paper and they are arranged to be operated in step-by-step relation so as to feed the paper in a step-by-step manner past the recording area. After leaving the feed rollers 120, 121, the paper passes over another curved guide 122 and outwardly of the machine. If desired, the recorder may be enclosed within a suitable box or housing 123 having a window 124 in its top wall through which the message or other representation may be viewed at the same time that it is being recorded on the strip. For this purpose, the supports 119 and 122 may be made of transparent material or may be positioned so that they do not interfere with the viewing of the recording area of the strip through the window. The feed rollers 120, 121, may be driven from the same motor which drives the stylus arm 106 and since the latter is rotating continuously, it is necessary to couple the rollers 120 and 121 to the motor through an intermittently operating mechanism; such a mechanism is represented in Figs. 9 and 10. For this purpose, the shaft 97 is coupled through suitable gearing (not shown) to a camshaft 124 which operates a cam 125. Cam 125 acts on a spring-pressed cam follower 126, a link 127, a pawl arm 128, a pawl 129 and ratchet wheel 130. Wheel 130 is fastened to the shaft which carries roller 120 or to the shaft which carries roller 121. The gearing between shaft 97 and shaft 124 is such that for each complete revolution of the stylus arm 106, the paper is fed forward in the direction of its length a small distance, for example 0.01 inch. It will be understood of course that any other well known form of step-by-step paper feeding mechanism may be employed. Since the stylus contacts with the paper during recording, if the paper is fed during this recording, there will be a drag on the stylus and a drag on the paper resulting in imperfections and inaccuracies in the reproduction. It is preferred therefore, to arrange the cam 125 so that it operates the feed rollers to feed the paper only during the portion of the rotation of arm 106 when the stylus is not recording, that is, where it is out of contact with the strip 102.

Figure 11:
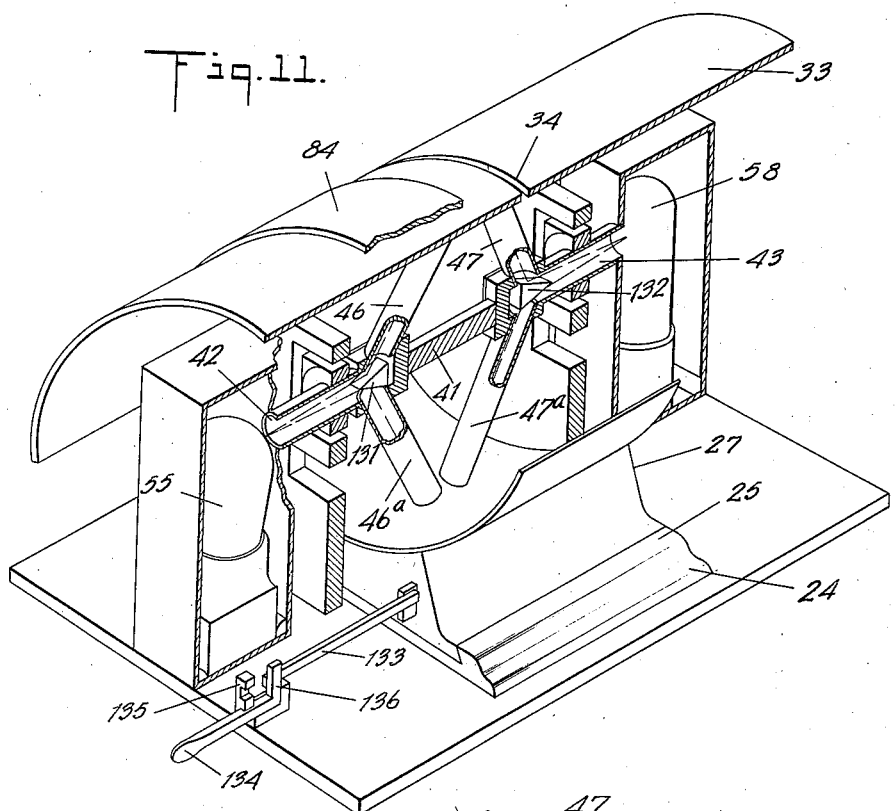
Fig. 11 is a perspective sectional view of a modification of the transmitter shown in Figs. 2 and 3.
Figure 12:
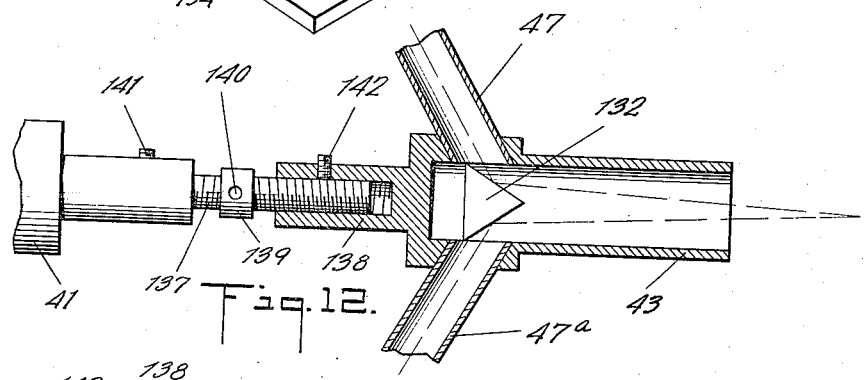
Fig. 12 is an enlarged detailed view of one of the optical systems of Fig. 11.
Figure 13:
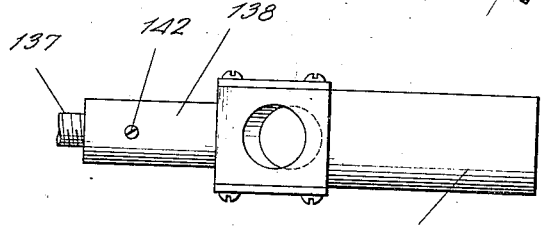
Fig. 13 is another view of part of Fig. 12.

Referring to Figs. 11, 12 and 13, there is shown a modification of the transmitter of Figs. 2 and 3, wherein the scanning time is materially reduced. In the embodiment of Figs. 2 and 3, there is provided a single rotating optical scanning system, and since the paper is curved around only approximately two-thirds of the drum periphery, there is a considerable portion of each revolution during which the optical system is not scanning the matter to be transmitted. This period of course may be used to transmit a suitable synchronizing system in any well known manner. In the embodiment of Figs. 11, 12 and 13, there are provided two separate optical scanning systems disposed on opposite diameters of the rotating member 41. Since in this embodiment, the two optical systems are symmetrically disposed with respect to member 41, it is not necessary to employ the special counter balance 50 of Figs. 2 and 3. The parts of Fig. 11 which are the same as those of Figs. 2 and 3 are designated by the same numerals. The light from lamp 55 is projected through the hollow shaft section 42 and mounted within the section 42 for rotation therewith is a double mirror or double reflecting prism 131. The light is reflected from one face of prism 131 through tube 46 and through the slit 34 to the paper which is conformed around the support 33. The light reflected from each elemental area of the strip being scanned is reflected through tube 47, to a face of a double mirror or reflecting prism 132 and thence through the shaft section 43 to the light sensitive cell 58, it being understood of course, that suitable adjustable optical systems similar to 51, 52 (Fig. 2) are provided at the ends of the shaft sections 42, 43 and also in the tubes 46 and 47, these parts being omitted in Fig. 11 for the sake of clarity.

A similar scanning system comprising the tubes 46ᵃ, 47ᵃ, are provided so that for each revolution of shaft 41, two successive linear elements of the strip are scanned. The remaining parts of the transmitter of Fig. 11 are similar to and function in the same manner as the corresponding parts of Figs. 2 and 3. However, in Fig. 11 the pedestal 27 is adjusted longitudinally with respect to the slit 34 by means of a level 133 which is provided with an operating handle 134 and a pair of stops 135, 136. The stops are so arranged that when the handle 134 is pushed inwardly to engage the stop 136, the optical scanning system scans the subject matter through the slit 34. When it is desired to transmit a special constant frequency signal without scanning the subject matter to be transmitted, the handle 134 is pulled outwardly to engage stop 135 whereby the scanning system scans the series of alternate light and dark areas 34ᵇ on the left-hand margin of the slot 34 as described above in connection with Fig. 2. In order that the two halves of each of the scanning optical systems may be independently adjusted longitudinally of the device, preferably the hollow shaft sections 42 and 43, are adjustably mounted on the ends of the shaft 41 as shown in detail in Fig. 12. For example, the end of shaft 41 may be threaded to receive a correspondingly threaded extension 137. The other end of the extension 137 is also threaded in the opposite direction into a correspondingly threaded portion 138 of the shaft section 43. The extension 137 is preferably provided with an integral member 139 having holes or recesses 140 to receive an adjusting member. By turning the member 139 in one direction, the optical systems 47, 47ᵃ, are moved towards the left. By turning the member 139 in the opposite direction, the optical systems 47, 47ᵃ are moved to the right. When the optical systems have been properly adjusted with respect to the slit 34, they may be fastened in place by suitable set screws 141, 142. It will be understood of course that the optical systems 46, 46ᵃ are provided with similar adjusting mechanism to that shown in Figs. 12 and 13.

With the arrangement of Fig. 11, since the duplicate scanning systems are alternately effective during each complete revolution, the strip to be scanned can be disposed around the periphery of support 33 to an arc of approximately 180 degrees so that both scanners do not scan at the same time.

Figure 14:
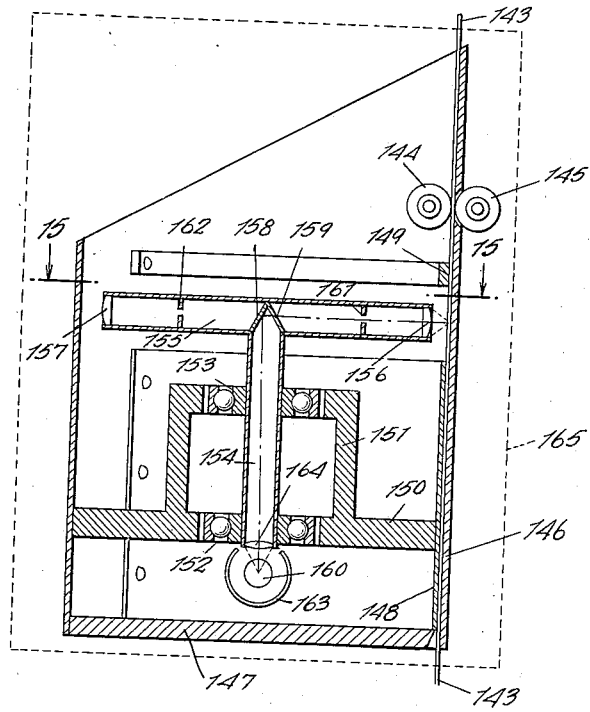
Fig. 14 is a vertical sectional view of a modified form of recorder.
Figure 15:
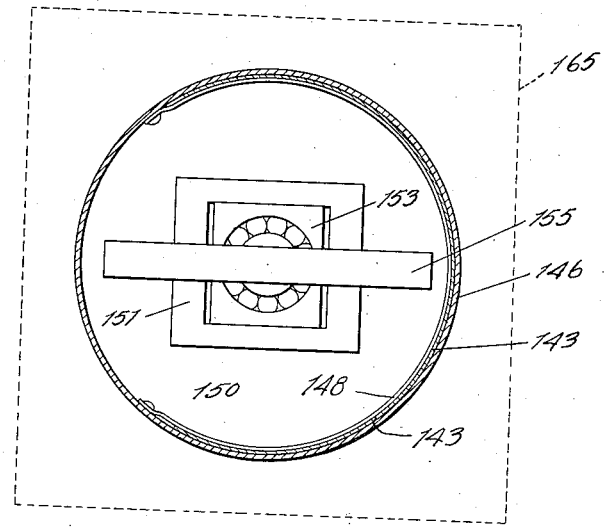
Fig. 15 is a sectional view of Fig. 14 taken along the line 15—15 thereof.

Instead of employing a facsimile recorder of the electro-chemical type as shown in Figs. 4 to 10, an optical or photographic recorder may be employed. The structure of such a recorder may in general be the same as that of Figs. 4 and 5 with the exception that a rotating scanning light spot system is employed in place of a rotating stylus system. Such an arrangement is diagrammatically shown in Figs. 14 and 15, it being understood that instead of recording on a chemically treated paper strip, the recording is effected on a sensitized photographic strip such for example as a moving picture film of the required width. This film 143 is fed by feed rollers 144, 145, while it is held in transverse arcuately shaped form against the inner face of a cylindrical drum 146. Drum 146 may be fastened to a circular base 147 having approximately two-thirds of its periphery undercut to provide an arcuate slot between it and member 146, through which the sensitized film 143 is fed from a pay-off reel (not shown). The film is retained in its transverse arcuate shape against member 146 by suitable inner curved supports 148, 149.

Rigidly mounted within drum 146 is a base 150 having a bearing bracket 151. Base 150 and bracket 151 support respective ball bearings 152, 153, which act as thrust and radial bearings for a hollow metal shaft 154. Shaft 154 is provided with a suitable gearing arrangement by means of which it may be continuously rotated from a suitable motor (not shown).

Fastened transversely to the upper end of shaft 154 is a hollow metal tube 155 having adjustably mounted at opposite ends therein suitable lens systems 156, 157. Also fixedly mounted within tube 155 are a pair of transparent mirrors 158, 159, which are mounted symmetrically to each other and at such an angle that light from a lamp 160 positioned adjacent the lower end of shaft 154 is totally reflected from mirror 158 through a suitable apertured mask 161 and lens system 156 on to the film 143, in the form of an elemental light spot. Likewise the light is reflected by mirror 159 through apertured mask 162 in tube 155 through the lens system 157.

The lamp 160 may be of any type well known in the facsimile recording art which is adapted to have its intensity varied or modulated under control of received facsimile signals impressed thereon. The lamp 160 is preferably enclosed in a light-tight housing 163 so that its emergent light is collected by lens 164 and confined to tubes 154, 155, it being understood that the entire mechanism is enclosed in a light-proof housing 165, or is operated in a photographic dark room so that the only light which reaches the sensitized surface of film 143 is that which is imaged thereon by lens 156 or lens 157.

It will be understood of course that the optical systems are rotated in synchronism with the transmitting scanner, and during each revolution of shaft 154, the lens systems 156, 157, are alternately effective in scanning the film 143, consequently the film should be curved to an arc of approximately 180 degrees around the inner surface of member 146 so that as one scanner 156 is just finishing its scanning the other scanner 157 is about to begin. The film 143 is advanced a small distance, for example 0.01 inch between each complete transverse scanning by one of the scanning systems. If desired, the film instead of being fed in a step-by-step fashion between successive scanning traverses of the dual scanners, may be fed in a continuous section so that it advances approximately 0.01 inch for each half revolution of shaft 154. It will be understood of course that a dual scanner is not necessary and that a single centrifugally balanced scanner may be employed, similar to the embodiment of Figs. 4 and 5 in which case the film 143 can be curved to a transverse arc of greater than 180 degrees.

After the film is completely scanned, it can be passed through any suitable continuous photographic developing mechanism such as is used in the motion picture developing art.

While in the foregoing, the transmission has been described as applied to the scanning of a paper strip having the printed matter or the like to be scanned facing the scanner it will be understood that the transmitters of Figs. 2, 3 and 11 to 13 are also capable of scanning transparencies by providing a white or light reflecting backing for the transparency at the scanning region. For example in Fig. 2, the guide 83 may be painted white on the side facing drum 33 so that a transparency such as a negative motion picture film as it is fed between members 33 and 34 can be scanned more effectively. By suitable biassing of the light cell and arranging of amplifier tubes either at the transmitter or receiver either a positive or negative reproduction can be effected.

The invention is also useful in scanning two separate strips simultaneously or scanning different portions of the same strip simultaneously. Such an arrangement is schematically illustrated in Fig. 16 wherein a completely circular scanning slit 166 is provided between two cylindrical drums 167, 168. Rotatably mounted within the drums is a shaft 169 carrying a hollow extension 170 which in turn carries a pair of hollow tubes 171, 172 similar to tubes 46, 47, (Fig. 2). Attached to the other end of shaft 169 is a hollow tube 173 which is divided into two separate tubes 174, 175, by an opaque wall 176. Associated with the outlet end of tube 175 is a photocell 177, and associated with the outlet end of tube 174 is another photocell 178. The light emerging from tube 175 is reflected by a suitable reflector 179 and lens 180 to cell 177. Likewise the light emerging from tube 174 is reflected by a reflector 181 and lens 182 to cell 178.

Mounted at the end of member 170 is a suitable source of light 183 similar to lamp 55 (Fig. 2) it being understood that a suitable double reflector 184 is mounted adjacent the tubes 171, 172, similar to reflector 110 (Fig. 11). Likewise suitable reflectors 185 and 186 are provided to collect the light reflected from the scanned areas of the subjects and to reflect it respectively through tubes 174, 175.

The subject matter to be scanned may be in the form of a single sheet or strip 187 curved transversely to a circular form around drums 167, 168, or two separate strips may be employed each curved transversely to semi-circular form around the drums with the longitudinal edges of the strips in abutting relation. In either case the strip or strips are fed in the direction of the arrow in timed relation to the rotation of shaft 169. The response of cells 177, 178, may then be transmitted simultaneously to a corresponding reproducer similar for example to that of Fig. 14 with the exception that the tube 154 will be divided by a longitudinal opaque diaphragm into two separate tubes and mounted adjacent the light inlet ends of these tubes will be two separate lamps similar to lamp 160 each lamp being independently controlled by a corresponding one of the cells 177, 178 and being light shielded from each other.

Various changes and modifications in the several embodiments may be made without departing from the spirit and scope of the invention.

What I claim is:

1. A scanning arrangement for telefacsimile systems including means to feed an elongated record sheet in the direction of its length past a scanning member, means to form the sheet as it passes said member around a curved support, means acting circumferentially on said sheet to maintain said sheet taut around said support, said means also positively feeding said sheet along said support and means to move said scanning member to scan the concave surface of the sheet.

2. A scanning arrangement for telefacsimile systems including means to feed an elongated record sheet in the direction of its length past a scanning member, means to form the sheet as it passes said member into a transverse circular arc, around a curved support, means acting circumferentially on said sheet to maintain said sheet taut around said support while positively feeding said sheet along said support, and means to rotate a scanning member around an axis which is substantially concentric with the axis of said arc.

3. A scanning arrangement for telefacsimile systems including a rotatable shaft having axially aligned tubular portions at the ends, a first tubular lens housing carried by said shaft and communicating optically with one tubular end portion of said shaft, another tubular lens housing carried by said shaft and communicating optically with the other tubular end portion of said shaft, said lens housings being carried by said shaft and disposed at an angle to each other and at an angle to the shaft, a light source adjacent the first tubular end portion, a light sensitive cell adjacent the other tubular end portion, means to support a record sheet in arcuately curved formation, and means to rotate said shaft and lenses to scan said sheet in successive parallel lines.

4. A scanning arrangement according to claim 3 in which the means to support said record sheet includes a curved plate having a peripheral slot, and the optical axes of said lens housings converge through said slot.

5. A scanning arrangement for telefacsimile systems comprising a rotatable shaft carrying a scanning system, a curved plate for supporting a record sheet therearound, a peripheral slot in said plate to expose said sheet to said scanning system, means to rotate said shaft and scanning system, and means to shift said plate and said scanning system relatively to each other to scan a marginal portion of said slot for the purpose of generating a frequency signal independent of the record sheet.

6. A scanning arrangement for telefacsimile systems comprising a rotatable shaft carrying a scanning system, a support for a record sheet, said support having a slot to expose said sheet to said scanning system, a plurality of alternate light and dark areas on the margin of said slot, means to rotate the scanning system relatively to said support to scan the record in successive parallel lines, and means to shift the longitudinal relation between said scanning system and said slot to cause said scanning system to scan the light and dark areas on a margin of said slot to generate a special frequency signal independent of the record sheet.

7. A scanning arrangement for telefacsimile systems including a curved support for a record sheet to be scanned, a peripheral scanning slot in said support, a plurality of alternate light and dark areas on a margin of said slot for the purpose described, and means to scan said alternate light and dark areas to produce a frequency signal independent of the record sheet.

8. A scanning arrangement according to claim 7 in which said curved support is provided with a peripheral slot and is fastened to a pedestal which is mounted between a pair of longitudinal parallel guides, said pedestal having three selective positions in one of which the scanning lens system is in optical alignment with the said slot and in the second of which positions the scanning lens system is in optical alignment with one margin of said slot and in the third of which positions the scanning lens system is in optical alignment with the other margin of said slot.

9. In a telefacsimile scanner, a curved support for supporting a record sheet therearound, and means to feed the sheet longitudinally along the support, the last-mentioned means including a pair of positively driven feed rollers bearing against the sheet and said support, and means to rotate said feed rollers around axes substantially perpendicular to the linear elements of said curved support.

10. In a telefacsimile scanner, a curved support for supporting a record sheet therearound, a rotatable scanner for scanning said sheet said scanner rotating around an axis substantially parallel to the length of said support, and means to feed said sheet longitudinally along said support, the last-mentioned means including a pair of positively driven rollers engaging said sheet to press it against said support at opposite sides thereof, and means to rotate said rollers about axes which are substantially perpendicular to the axis of rotation of said scanner.

11. A telefacsimile scanner according to claim 10 in which certain of said rollers have peripheral faces conforming substantially to the curvature of said support so that when they are positively rotated to feed the sheet, they tend to maintain the sheet taut around said support.

12. In a telefacsimile scanner, a curved support for supporting a record sheet therearound, and means to feed the sheet along the support comprising a plurality of feed rollers engaging the sheet, said rollers being circumferentially spaced around the periphery of said support, and means independent of the movement of the sheet to drive said rollers positively as a unit.

13. In a telefacsimile scanner, a curved support for supporting a record sheet therearound, and means to feed said sheet along the support comprising a plurality of feed rollers arranged in spaced relation around the periphery of said support, each of said rollers being fastened to individual shafts, and meshed gears at the adjacent ends of each shaft whereby all said rollers are positively driven at the same angular speed.

14. In a telefacsimile scanning arrangement, a cylindrical drum, a rotatable scanner mounted within said drum, means to support a record sheet on the exterior of said drum, and means to feed said sheet parallel to the linear elements of the drum, the last-mentioned means including a bracket carrying a plurality of individual shafts arranged end-to-end, at least one feed roller carried by each shaft, and meshed gears between the adjacent ends of the shafts to drive said shafts positively as a unit.

15. A telefacsimile scanner according to claim 14 in which a pair of said rollers on opposite sides of the drum periphery are shaped to maintain the sheet taut around the drum.

16. A telefacsimile reproducer comprising a curved support, means to support a record sheet in arcuately curved form against the curved surface of said support, a rotatable scanner, means to rotate said scanner continuously to scan the concave surface of said sheet, and means to advance said sheet in step-by-step relation to said scanner, the last-mentioned means including a plurality of positive feed rollers mounted around the periphery of said support, said feed rollers being connected to a common driving shaft for positively rotating said rollers independently of the movement of the sheet.

17. A telefacsimile reproducer including a cylindrical drum, means to support an elongated record sheet in arcuately curved form against the curved surface of said drum, means including a plurality of feed rollers circumferentially surrounding said drum and having a common shaft for driving said rollers positively to feed said sheet in a step-by-step manner in the direction of the longitudinal axis of the drum, and means to rotate continuously a scanning device within the drum to scan the concave surface of said sheet.

ARTHUR C. RUSTAD.